(12) United States Patent
Li et al.

(10) Patent No.: US 11,899,145 B2
(45) Date of Patent: Feb. 13, 2024

(54) SEISMIC SOURCE AND WAVE DETECTOR INTEGRATED DEVICE AND METHOD FOR SEISMIC WAVE EXPLORATION

(71) Applicant: SHANDONG UNIVERSITY, Shandong (CN)

(72) Inventors: Shucai Li, Jinan (CN); Maoxin Su, Jinan (CN); Yiguo Xue, Jinan (CN); Peng Wang, Jinan (CN); Daohong Qiu, Jinan (CN); Yimin Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 302 days.

(21) Appl. No.: 17/296,855

(22) PCT Filed: Nov. 4, 2020

(86) PCT No.: PCT/CN2020/126496
§ 371 (c)(1),
(2) Date: May 25, 2021

(87) PCT Pub. No.: WO2021/093651
PCT Pub. Date: May 20, 2021

(65) Prior Publication Data
US 2022/0026592 A1   Jan. 27, 2022

(30) Foreign Application Priority Data
Nov. 13, 2019   (CN) .......................... 201911117880.X

(51) Int. Cl.
*G01V 1/04*   (2006.01)
*G01V 1/18*   (2006.01)

(52) U.S. Cl.
CPC .................. *G01V 1/04* (2013.01); *G01V 1/18* (2013.01); *G01V 2210/121* (2013.01); *G01V 2210/1295* (2013.01); *G01V 2210/1425* (2013.01)

(58) Field of Classification Search
CPC ...... G01V 1/04; G01V 1/18; G01V 2210/121; G01V 2210/1295; G01V 2210/1425
See application file for complete search history.

(56) References Cited

U.S. PATENT DOCUMENTS 4,655,314 A * 4/1987 Airhart .................. G01V 1/155
                                              181/114
4,853,907 A * 8/1989 Bays ..................... G01V 1/155
                                              181/119
(Continued)

FOREIGN PATENT DOCUMENTS

CN   101535837 A  *  9/2009  ............. G01V 1/223
CN   201570609 U  *  9/2010
(Continued)

OTHER PUBLICATIONS

CN-107037477-A (Machine Translation) (Year: 2017).*
(Continued)

*Primary Examiner* — Yuqing Xiao
*Assistant Examiner* — Christopher Richard Walker
(74) *Attorney, Agent, or Firm* — Oliff PLC

(57) ABSTRACT

A wave detector integrated device includes a support, protective shell and mode converter. The protective shell is installed on the support and rotates by the mode converter, and has a hollow cylindrical structure. A seismic source hammer is suspended at a protective shell central axis position. Electromagnetic accelerators are installed in a bus direction of the protective shell, and the seismic source hammer is connected with the electromagnetic accelerators. A drill bit type wireless transmission wave detector or (Continued)

standby flat bottom type wave detector is connected above the protective shell through a second telescopic rod having a driving device therein and driving the drill bit type wave detector to rotate. A power supply is installed inside the protective shell, and is connected with a current controller and circuit protection device. The current controller is respectively connected with the electromagnetic accelerators, drill bit type wave detector, driving device and mode converter.

18 Claims, 2 Drawing Sheets

(56) References Cited

U.S. PATENT DOCUMENTS

| | | | | |
|---|---|---|---|---|
| 6,065,562 | A * | 5/2000 | Bird | G01V 1/053 |
| | | | | 367/75 |
| 9,507,039 | B2 * | 11/2016 | Kamata | G01V 1/153 |
| 2009/0073807 | A1 * | 3/2009 | Sitton | G01V 1/005 |
| | | | | 367/189 |
| 2011/0011668 | A1 * | 1/2011 | Hampshire | G01V 1/047 |
| | | | | 181/113 |
| 2012/0294123 | A1 * | 11/2012 | You | G01V 1/18 |
| | | | | 367/188 |
| 2015/0268127 | A1 | 9/2015 | Berchtold | |
| 2016/0056645 | A1 * | 2/2016 | Henman | G01V 1/247 |
| | | | | 320/112 |

FOREIGN PATENT DOCUMENTS

| | | | | |
|---|---|---|---|---|
| CN | 201594143 | U | 9/2010 | |
| CN | 101910870 | A * | 12/2010 | ............ G01V 1/18 |
| CN | 102426196 | A | 4/2012 | |
| CN | 104614759 | A | 5/2015 | |
| CN | 205280950 | U | 6/2016 | |
| CN | 107037477 | A * | 8/2017 | ............ G01V 1/159 |
| CN | 107037477 | A | 8/2017 | |
| CN | 107346032 | A * | 11/2017 | |
| CN | 207586436 | U | 7/2018 | |
| CN | 208213581 | U | 12/2018 | |
| CN | 109143395 | A * | 1/2019 | ............ G01V 8/10 |
| CN | 110824547 | A | 2/2020 | |

OTHER PUBLICATIONS

CN-107346032-A (Machine Translation) (Year: 2017).*
CN-109143395-A (Machine Translation) (Year: 2019).*
CN-201570609-U (Machine Translation) (Year: 2010).*
CN-101910870-A (Machine Translation) (Year: 2010).*
CN-101535837-A (Machine Translation) (Year: 2009).*
Jan. 27, 2021 International Search Report issued in International Patent Application No. PCT/CN2020/126496.
Jan. 27, 2021 Written Opinion issued in International Patent Application No. PCT/CN2020/126496.

* cited by examiner

SEISMIC SOURCE AND WAVE DETECTOR INTEGRATED DEVICE AND METHOD FOR SEISMIC WAVE EXPLORATION

BACKGROUND

Technical Field

The present invention relates to a seismic source and wave detector integrated device and method for seismic wave exploration.

Related Art

The seismic wave method is a common detection method. Compared with other common geophysical exploration methods such as an electrical method, the method is less influenced by the environment, and the detection precision of the geological structure is higher, so that the method is widely used in various fields of construction engineering.

The inventor found that the main mode of detecting by using the seismic wave method at present is that one or more wave detectors are arranged in a detection area according to relevant parameters of a detecting line (detecting line trend, offset distance, channel spacing and the like), meanwhile, a trigger is attached to a device for exciting a seismic source, and the device is connected with a host. In the detection process, a manual hammering mode is usually used as the seismic source, and it is difficult to ensure that the data quality of each channel and the energy of each excitation are consistent. When a detecting point moves, a seismic source hammer, the host and the wave detector (single-channel acquisition) need to be carried to move, and time and labor are wasted. If the ground hardness is high, the wave detector is hard to plug into the ground, so that the coupling effect is poor, and the data acquisition quality is influenced.

SUMMARY

The present invention mainly aims to solve the above problems and improve the efficiency and quality of seismic wave detection work, and provides a device integrating a seismic source device and a wave detector into a whole. When the device is used as the seismic source device, the electromagnetic effect can be utilized to carry out controllable acceleration, so as to ensure the quality of the seismic source. When used as the wave detector, the device can be drilled into the ground surface through a drill bit type wave detector carried by the device to ensure the coupling quality of the wave detector and the stratum and meanwhile to ensure that the device is suitable for sites with different conditions such as higher ground hardness. The switching of the two modes can be realized in a wireless control manner. The present invention has the advantages of high efficiency, convenience, time saving and labor saving.

In order to achieve the objective, the present invention adopts the following technical solutions.

A first aspect of the present invention provides a seismic source and wave detector integrated device for seismic wave exploration, which includes a support, a protective shell and a mode converter.

The protective shell is installed on the support and is driven to rotate up and down by the mode converter.

The protective shell is of a hollow cylindrical structure.

An inverted-cone-frustum-shaped seismic source hammer is suspended at a central axis position of the protective shell through a first telescopic rod; electromagnetic accelerators are installed in a bus direction of the protective shell; and the inverted-cone-frustum-shaped seismic source hammer is connected with the electromagnetic accelerator.

A drill bit type wireless transmission wave detector or a standby flat bottom type wave detector is connected above the protective shell through a second telescopic rod, and a driving device is further arranged in the second telescopic rod and can drive the drill bit type wave detector to rotate.

A power supply is further installed inside the protective shell; the power supply is connected with a current controller and a circuit protection device; and the current controller is respectively connected with the electromagnetic accelerators, the drill bit type wave detector, the driving device and the mode converter, so as to realize the control of the whole device.

Further, a plurality of groups of electromagnetic accelerators are disposed, and the plurality of groups of electromagnetic accelerators are uniformly disposed along a circumferential direction of the protective shell.

Further, each group of the electromagnetic accelerators mainly consists of three electromagnets. Two of the electromagnets are fixed on an inner wall of the protective shell and called "accelerator stators"; and the other one is installed on a guide rail parallel to a bus of the protective shell, can only vertically move up and down and is called an "accelerator rotor". Each of the electromagnets is directly connected with the current controller through a wire, and a wire, connected to the accelerator rotor, of the current controller should be provided with a scroll type spring spooler-unspooler to ensure that the wire always keeps a proper length when the accelerator rotor moves.

Further, the seismic source hammer is connected with the accelerator rotor through an extension arm, and a joint between the extension arm and the accelerator rotor is insulated to prevent mutual interference among the plurality of electromagnetic accelerators.

Further, the seismic source hammer is connected with the protective shell through a first telescopic rod, and a spring can be disposed at the first telescopic rod. When the seismic source hammer is lifted up under the action of the electromagnetic accelerators, the spring is in a compression state. When the seismic source hammer falls, elastic potential energy stored in the spring can increase a momentum of the seismic source hammer.

Further, the drill bit type wave detector, the standby flat bottom type wave detector and the second telescopic rod are detachably connected.

Further, two electric supports are provided and are disposed on two sides of the protective shell respectively. Each of the electric supports includes a base and two telescopic rods fixed on the base. The two telescopic rods are disposed at a certain angle, and form a triangle with the base. Tops of the two telescopic rods are connected together through a connecting frame, and the mode converter is fixed on the connecting frame. The two telescopic rods can automatically stretch and retract to adjust a height of the device, and both the telescopic rods and the mode converter have a locking function to ensure the stability of the device during working.

Further, the seismic source and wave detector integrated device for seismic wave exploration further includes a remote control device. The remote control device receives signals through a wireless signal receiver, and adjusts the current controller through a micro control device.

In a second aspect, based on the seismic source and wave detector integrated device for seismic wave exploration, the present invention provides an operation method, which includes the following steps:

1. installing the whole device, that is, after a working mode is adjusted, locking an electric support and a rotor of a mode converter at first, so as to ensure stability of the device;
2. when the device is used as a seismic source device, enabling one end of a seismic source hammer to face the ground, enabling a lower edge of a protective shell to be in contact with the ground, sending an instruction by a remote control device, and controlling electromagnetic accelerators to enable the seismic source hammer to be slowly lifted up to enter an energy storage state;
3. after the remote control device sends a hammering instruction, rapidly hammering the ground by the seismic source hammer under the action of the electromagnetic accelerators, transmitting a seismic source signal to a host by a wireless trigger attached to the seismic source hammer, and repeating the operation to realize data superposition;
4. when the device is converted to be a wave detector for use, firstly raising an electric support to a height at which the device can rotate, then canceling locking of the rotor of the mode converter, executing locking again after the rotor rotates by 180 degrees, lowering the electric support slowly to a proper height, and adjusting a telescopic rod behind the wave detector to a proper length to enable the wave detector to be in contact with the ground; and a process of switching a wave detector mode to a seismic source mode is the same as this; and
5. turning on a motor disposed in the wave detector, slowly extending the telescopic rod to enable the drill bit type wave detector to be screwed into the ground, so as to achieve good coupling, and after a seismic source is generated, transmitting measured data to the host by the wave detector through a wireless signal; in addition, for artificially hardened flat road surface, the drill bit type wave detector can be replaced with a flat bottom type wave detector.

Further, after each seismic source position and detecting point position of a detecting line are determined, the above device can be disposed at each seismic source or detecting point, the remote control device is used for controlling, a mode and a working state of each device are adjusted, and single-channel or multi-channel seismic wave detection work is completed.

Compared with a seismic wave detection device commonly used at present, the present invention has the following beneficial effects:

1. The present invention can achieve the objective of multiple acquisitions under one-time arrangement, avoids the defect that a traditional method needs to continuously move a seismic source or a wave detector in the detection process, and improves the working efficiency.

2. When the present invention is used as the seismic source device, the intensity of the seismic source is controlled through the electromagnetic accelerators, accurate control over the intensity of the seismic source can be realized while the quality of a signal of the seismic source is ensured, and energy output is reasonably controlled according to stratum conditions and depths required to be detected.

3. When the present invention is used as the wave detector, on one hand, the wave detector can be better coupled with the ground with different hardness in a drilling manner, and the quality of detection data is ensured; and on the other hand, the wave detector can be pulled out in a counter-rotation manner, so that damage caused by factors such as excessive hardness of the ground when a traditional straight plugging type wave detector is arranged and recovered is avoided.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

Figure 1:
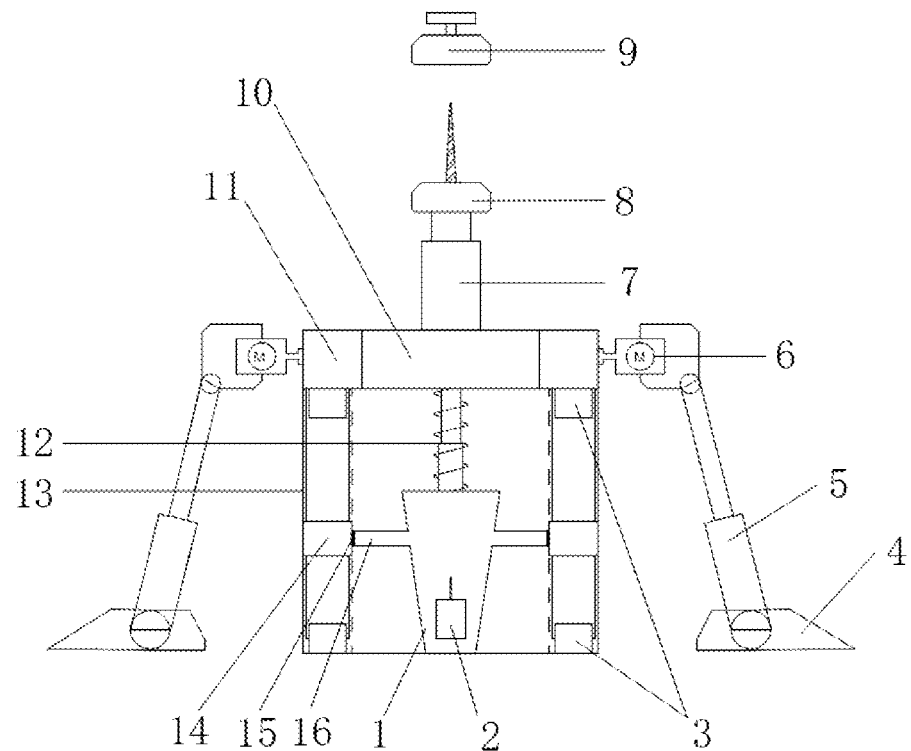
FIG. 1 is a schematic diagram of an overall structure of the present invention in a seismic source mode.

Reference numerals: inverted-cone-frustum-shaped seismic source hammer 1, wireless trigger 2, electromagnetic accelerator stator 3, electric support base 4, electric support telescopic rod 5, mode converter 6, wave detector telescopic rod 7, drill bit type wireless transmission wave detector 8, standby flat bottom type wave detector 9, rechargeable lithium battery 10, current controller 11, seismic source hammer telescopic rod 12, cylindrical shell 13, electromagnetic accelerator rotor 14, insulating layer 15, and seismic source hammer extension arm 16.

DETAILED DESCRIPTION

The present invention is further described below with reference to the accompanying drawings and embodiments.

It should be noted that the following detailed descriptions are all exemplary and are intended to provide a further understanding of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

In the present invention, orientation or positional relationships indicated by terms such as "upper", "lower", "left", "right", "front", "rear", "vertical", "horizontal", "side", "bottom" and the like are orientation or positional relationships shown in the drawings, merely relational words determined for ease of recitation of structural relationships of various components or elements of the present invention, are not specific to any component or element of the present invention, and are not to be construed as a limitation on the present invention.

In the present invention, terms such as "fixedly connected", "connected", "connected with" and the like are to be understood broadly, meaning that the terms can be either fixedly connected, or integrally connected or detachably connected; can be direct connection, and also can be indirect connection through an intermediate medium. For the relevant scientific research or technical personnel in the art, the specific meaning of the above terms in the present invention can be determined according to the specific circumstances and cannot be construed as a limitation on the present invention.

As described in the related art, in the prior art, the inventor found that the main mode of detecting by using the seismic wave method at present is that one or more wave detectors are arranged in a detection area according to relevant parameters of a detecting line (detecting line trend, offset distance, channel spacing and the like), meanwhile, a trigger is attached to a device for exciting a seismic source, and the device is connected with a host. In the detection process, a manual hammering mode is usually used as the seismic source, and it is difficult to ensure that the data quality of each channel and the excitation energy of each time are consistent; when a detecting point moves, a seismic source hammer, the host and the wave detector (single-channel acquisition) need to be carried to move, and time and labor are wasted; if the ground hardness is high, the wave detector is hard to plug into the ground, so that the coupling effect is poor, and the data acquisition quality is influenced. In order to solve the above problem and improve the efficiency and quality of seismic wave detection work, the present invention provides a device integrating a seismic source device and a wave detector into a whole. When the device is used as the seismic source device, the electromagnetic effect can be utilized to carry out controllable acceleration, so as to ensure the quality of the seismic source. When used as the wave detector, the device can be drilled into the ground surface through a drill bit type wave detector carried by the device to ensure the coupling quality of the wave detector and the stratum and meanwhile to ensure that the device is suitable for sites with different conditions such as higher ground hardness. The switching of the two modes can be realized in a wireless control manner. The present invention has the advantages of high efficiency, convenience, time saving and labor saving.

Specifically, a seismic source and wave detector integrated device for seismic wave exploration includes a support, a protective shell and a mode converter. The protective shell is installed on the support and is driven to rotate up and down by the mode converter. The protective shell is of a hollow cylindrical structure. An inverted-cone-frustum-shaped seismic source hammer is suspended at a central axis position of the protective shell through a first telescopic rod. Electromagnetic accelerators are installed in a bus direction of the protective shell, and the inverted-cone-frustum-shaped seismic source hammer is connected with the electromagnetic accelerator. A drill bit type wireless transmission wave detector or a standby flat bottom type wave detector is connected above the protective shell through a second telescopic rod. A driving device is further arranged in the second telescopic rod and can drive the drill bit type wave detector to rotate. A power supply is further installed inside the protective shell, the power supply is connected with a current controller and a circuit protection device, and the current controller is respectively connected with the electromagnetic accelerators, the drill bit type wave detector, the driving device and a motor, so as to realize the control of the whole device.

The present invention is described in detail below with reference to specific drawings.

As shown in FIG. 1, a seismic source and wave detector integrated device system for seismic wave exploration includes an inverted-cone-frustum-shaped seismic source hammer 1, a wireless trigger 2, electromagnetic accelerator stators 3, electric support bases 4, electric support telescopic rods 5, a mode converter 6, a wave detector telescopic rod 7, a drill bit type wireless transmission wave detector 8, a standby flat bottom type wave detector 9, a rechargeable lithium battery 10, a current controller 11, a seismic source hammer telescopic rod 12, a cylindrical shell 13, electromagnetic accelerator rotors 14, insulating layers 15 and seismic source hammer extension arms 16.

The cylindrical shell 13 is integrally in a top-sealed cylindrical shape, includes an inner layer and an outer layer to form a hollow structure, and is internally provided with electromagnetic accelerators, the rechargeable lithium battery 10, the current controller 11 and the like.

The wireless trigger 2 is tightly fixed on the inverted-cone-frustum-shaped seismic source hammer 1 to ensure that high-quality seismic source trigger signals are obtained, and signals collected by an invalid trigger are sent to the host.

The cylindrical shell 13 is installed on two electric supports, and the two electric supports are symmetrical left and right relative to the cylindrical shell 13. In order to ensure the stability of the whole system, each of the electric supports includes an electric support base 4 and two electric support telescopic rods 5. The two electric support telescopic rods 5 are installed in a herringbone shape. The electric support base 4 uses an angle-adjustable design, so that it is convenient to stabilize the device at sites with different slopes.

Figure 2:
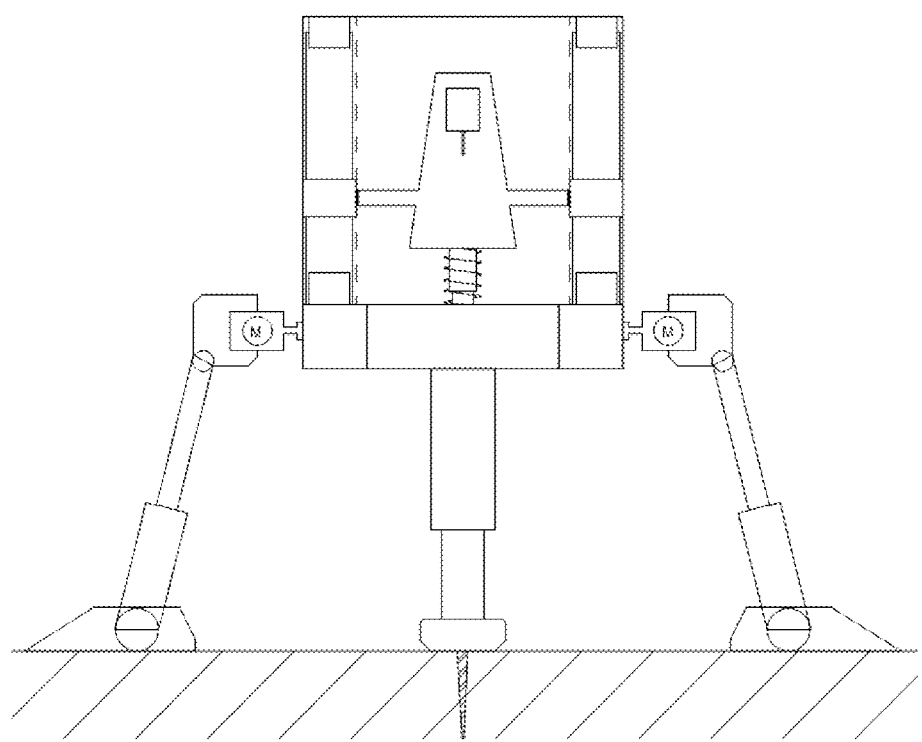
FIG. 2 is a schematic diagram of the present invention converted into a wave detector mode.

The mode converter 6 is an electric motor with a rotor locking function and is fixed at a joint of two telescopic rods of each of the electric supports. The mode converter 6 drives the whole cylindrical shell to rotate up and down through a connecting shaft, and FIG. 2 is a schematic diagram of the cylindrical shell 13 turned by 180 degrees.

A plurality of groups of electromagnetic accelerators are disposed in the cylindrical shell 13. Each group of electromagnetic accelerators mainly consists of three electromagnets. Two of the electromagnets are fixed on an inner wall of the protective shell and are called "accelerator stators", and the other one is installed on a guide rail parallel to a bus of the protective shell, can only move vertically up and down, and is called an "accelerator rotor". Each electromagnet is directly connected with the current controller through a wire, and a wire, connected to the accelerator rotor, of the current controller should be provided with a scroll type spring spooler-unspooler, so as to ensure that the wire always keeps a proper length when the accelerator rotor moves.

Further, two or more groups of electromagnetic accelerators should be disposed and arranged uniformly to ensure the quality of an acceleration effect to the seismic source hammer.

Further, on one hand, the current controller can change a direction of a current output to each accelerator stator and rotor, so as to form an electromagnet of "upper N and lower S" or "upper S and lower N", and the "accelerator rotor" is controlled to move upwards or downwards. On the other hand, an intensity of the current can be changed, so as to control an acceleration speed of the accelerator rotor.

Specifically, as shown in FIG. 1, each electromagnetic accelerator stator 3 consists of a pair of electromagnets fixed on the cylindrical shell 13, and two electromagnetic accelerator stators 3 and one electromagnetic accelerator rotor 14 jointly constitute a group of electromagnetic accelerator device. Further, in order to ensure the smoothness of the acceleration process, two or more groups of electromagnetic accelerator devices should be provided, and each group is uniformly distributed around an axis of the cylindrical shell 13. The left and the right are each provided with one group from the view of FIG. 1.

The whole inverted-cone-frustum-shaped seismic source hammer 1 is suspended on the cylindrical shell 13 through the seismic source hammer telescopic rod 12. A spring can be disposed at the telescopic rod. When the seismic source hammer is lifted up under the action of the electromagnetic accelerators, the spring is in a compression state. When the seismic source hammer falls, elastic potential energy stored in the spring can increase a momentum of the seismic source hammer.

The inverted-cone-frustum-shaped seismic source hammer 1 is connected to the electromagnetic accelerator rotor 14 through the seismic source hammer extension arm 16, and a joint is provided with the insulating layer 15 (or subjected to insulating treatment in other forms). Therefore, the inverted-cone-frustum-shaped seismic source hammer 1 obtains necessary kinetic energy under the action of the electromagnetic accelerators, meanwhile, mutual interference among the different electromagnetic accelerators is prevented, and the overall mechanical efficiency is ensured. Specifically as shown in FIG. 1, the seismic source hammer extension arm 16 is formed by extending outwards along a side face of the inverted-cone-frustum-shaped seismic source hammer 1. The number of the disposed seismic source hammer extension arms 16 is the same as that of the electromagnetic accelerator rotors 14.

Both the drill bit type wireless transmission wave detector 8 and the flat bottom type wave detector 9 are in a detachable design and are convenient to replace at any time. The drill bit type wireless transmission wave detector 8 and the flat bottom type wave detector 9 are detachably installed on the wave detector telescopic rod 7, and a motor is arranged in the wave detector telescopic rod 7, so that an inner rod of the telescopic rod can rotate, and the drill bit type wireless transmission wave detector 8 and the flat bottom type wave detector 9 are driven to rotate, facilitating installation, coupling and recovery thereof.

The drill bit type wireless transmission wave detector 8 is a device convenient to disassemble. On one hand, the drill bit type wireless transmission wave detector is convenient to replace after being seriously abraded due to long-term use. On the other hand, the drill bit type wireless transmission wave detector can be replaced with the flat bottom type wave detector 9 during detection on an artificially hardened flat road surface. Besides, as an auxiliary device, the device needs to be provided with the flat bottom type wave detector suitable for the flattened hardened ground so that the device can adapt to different working environments such as road surfaces, fields and tunnels.

A signal receiving and micro control device is disposed in the current controller 11 and can be directly connected with the rechargeable lithium battery 10. Current output to different elements is adjusted by receiving a remote control instruction, so that the overall mode converting, seismic source acceleration, wave detector placement and other work of the device are realized.

The above rechargeable lithium battery 10 can also be replaced by other power supplies.

Main functions of the device are realized by artificially sending the remote control instruction, receiving the remote control instruction through a wireless signal receiver and adjusting the current controller through a micro control device. It is ensured that automation can be achieved when the device is used for detection work, and the working efficiency is improved.

It needs to be pointed out that all the components are detachable, and maintenance and repair work in the using process is facilitated.

Figure 3:
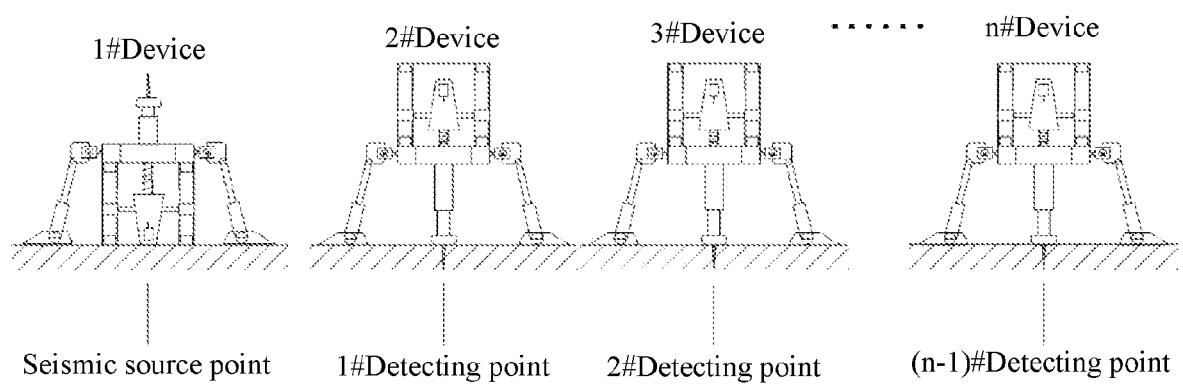
FIG. 3 is a schematic diagram of site work of the present invention.

An operation method of the above device and system includes the following steps:

1. As shown in FIG. 3, the above device is disposed on all detecting points of a detecting line along a detecting line direction on the basis of parameters such as offset distance and channel spacing. All the devices are connected with a host and a remote control device in a wireless transmission manner. A working state and mode of each device are set according to parameters such as an initial position of a seismic source and the number of acquisition channels. After an electric support is adjusted to enable the central axis of the device to be perpendicular to the ground, the support and a mode converter are locked.

2. The remote control device is used for commanding the device currently in a wave detector mode to extend a wave detector telescopic rod and screwing a wave detector plug into the ground to ensure good coupling (as shown in FIG. 2). For an artificially hardened road surface, a flat bottom type wave detector can be replaced to ensure that a bottom surface of the wave detector is in close contact with the ground.

3. After all wave detectors are ready, an instruction is sent to the device in a seismic source mode, a seismic source hammer is made to hammer the ground with controllable force under the action of electromagnetic accelerators, and seismic waves are generated. A trigger and the wave detectors currently serving as acquisition channels send data to the host in a wireless transmission manner. For repeated superposition required at one detecting point, the step can be repeated until the superposition frequency meets the requirement.

4. After the data of the detecting point is collected, the next device needing to be changed into the seismic source mode is selected according to the actual channel spacing and offset distance. An instruction is sent out through the remote control device, the device is converted into the seismic source mode, and the previous device used as the seismic source is converted into the wave detector mode.

5. The steps 3 and 4 are repeated until the data acquisition work of the current detecting line or detecting section is completed. If other detecting lines need to be detected, the steps are repeated.

When the present invention is used as the seismic source device, the intensity of the seismic source is controlled through the electromagnetic accelerators, accurate control over the intensity of the seismic source can be realized while the quality of a signal of the seismic source is ensured, and energy output is reasonably controlled according to stratum conditions and depths required to be detected.

When the present invention is used as the wave detector, on one hand, the wave detector can be better coupled with the ground with different hardness in a drilling manner, and the quality of detection data is ensured; and on the other hand, the wave detector can be pulled out in a counter-rotation manner, so that damage caused by factors such as excessive hardness of the ground when a traditional straight plugging type wave detector is arranged and recovered is avoided.

The above descriptions are merely preferred embodiments of this application and are not intended to limit this application. For a person skilled in the art, this application may have various modifications and changes. Any modification, equivalent replacement, or improvement made without departing from the spirit and principle of this application shall fall within the protection scope of this application.

What is claimed is:

1. A seismic source and wave detector integrated device for seismic wave exploration, the device comprising a support, a protective shell and a mode converter, wherein
the protective shell is installed on the support and is driven to rotate by the mode converter;
the protective shell is of a hollow cylindrical structure;
a seismic source hammer is suspended at a central axis position of the protective shell through a first telescopic rod, electromagnetic accelerators are installed in a bus direction of the protective shell, and the seismic source hammer is connected with the electromagnetic accelerators;
a drill bit type wireless transmission wave detector or a standby flat bottom type wave detector is connected above the protective shell through a second telescopic rod, and a driving device is further arranged in the second telescopic rod and can drive the drill bit type wireless transmission wave detector to rotate; and
a power supply is further installed inside the protective shell, the power supply is connected with a current controller and a circuit protection device, and the current controller is respectively connected with the electromagnetic accelerators, the drill bit type wave detector, the driving device and the mode converter, so as to realize control of the device, wherein
the seismic source hammer is positioned on one side of the mode converter and the drill bit type wireless transmission wave detector is positioned at a second side of the mode converter, and
the mode converter is configured to rotate the protective shell 180 degrees, thereby swapping the respective sides that the seismic source hammer and the drill bit type wireless transmission wave detector are positioned.

2. The seismic source and wave detector integrated device for seismic wave exploration according to claim 1, wherein a plurality of groups of electromagnetic accelerators are uniformly disposed along a circumferential direction of the protective shell.

3. The seismic source and wave detector integrated device for seismic wave exploration according to claim 2, wherein each group of the electromagnetic accelerators mainly consists of three electromagnets, wherein two of the electromagnets are fixed on an inner wall of the protective shell and are accelerator stators, the other one is installed on a guide rail parallel to a bus of the protective shell, can only vertically move up and down and is an accelerator rotor, and each of the electromagnets is directly connected with the current controller through a wire.

4. The seismic source and wave detector integrated device for seismic wave exploration according to claim 1, wherein a wireless trigger is installed on the seismic source hammer.

5. The seismic source and wave detector integrated device for seismic wave exploration according to claim 3, wherein the seismic source hammer is connected with the accelerator rotor through an extension arm, and a joint between the extension arm and the accelerator rotor is insulated.

6. The seismic source and wave detector integrated device for seismic wave exploration according to claim 1, wherein a spring can be disposed at the first telescopic rod.

7. The seismic source and wave detector integrated device for seismic wave exploration according to claim 1, wherein the drill bit type wireless transmission wave detector, the standby flat bottom type wave detector and the second telescopic rod are detachably connected.

8. The seismic source and wave detector integrated device for seismic wave exploration according to claim 1, wherein two electric supports are provided and are disposed on two sides of the protective shell respectively, each of the electric supports comprises a base and two telescopic rods fixed on the base, the two telescopic rods are disposed at a certain angle, and form a triangle with the base, tops of the two telescopic rods are connected together through a connecting frame, and the mode converter is fixed on the connecting frame.

9. The seismic source and wave detector integrated device for seismic wave exploration according to claim 1, further comprising a remote control device, wherein the remote control device receives signals through a wireless signal receiver, and adjusts the current controller through a micro control device.

10. An operation method of the seismic source and wave detector integrated device for seismic wave exploration according to claim 1, comprising:
installing the seismic source and wave detector integrated device;
using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and
converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

11. An operation method of the seismic source and wave detector integrated device for seismic wave exploration according to claim 2, comprising:
installing the seismic source and wave detector integrated device;
using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and
converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

12. An operation method of the seismic source and wave detector integrated device for seismic wave exploration according to claim 3, comprising:
    installing the seismic source and wave detector integrated device;
    using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and
    converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

13. An operation method of the seismic source and wave detector integrated device for seismic wave exploration according to claim 4, comprising:
    installing the seismic source and wave detector integrated device;
    using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and
    converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

14. An operation method of the seismic source and wave detector integrated device for seismic wave exploration according to claim 5, comprising:
    installing the seismic source and wave detector integrated device;
    using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and
    converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

15. An operation method of the seismic source and wave detector integrated device for seismic wave exploration according to claim 6, comprising:
    installing the seismic source and wave detector integrated device;
    using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and
    converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

16. An operation method of the seismic source and wave detector integrated device for seismic wave exploration according to claim 7, comprising:
    installing the seismic source and wave detector integrated device;
    using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

17. An operation method of the seismic source and wave detector integrated device for seismic wave exploration according to claim 8, comprising:

installing the seismic source and wave detector integrated device;

using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

18. An operation method of the seismic source and wave detector integrated device for seismic wave exploration according to claim 9, comprising:

installing the seismic source and wave detector integrated device;

using the seismic source and wave detector integrated device by enabling one end of a seismic source hammer to face the ground, enabling a lower edge of a protective shell to be in contact with the ground, controlling electromagnetic accelerators to enable the seismic source hammer to be lifted up to enter an energy storage state, then hammering the ground by the seismic source hammer under action of the electromagnetic accelerators, transmitting the seismic source signal to a host by a wireless trigger attached to the seismic source hammer, and repeating the operation to realize data superposition; and converting the seismic source and wave detector integrated device to be a wave detector, raising the support to a height at which the seismic source and wave detector integrated device can rotate, then canceling locking of a rotor of the mode converter, executing locking again after the rotor rotates by 180 degrees, lowering the electric support to a height, adjusting a second telescopic rod to a length, enabling the wave detector to be in contact with the ground, and after a seismic source is generated, transmitting measured data to the host by the wave detector through a wireless signal.

\* \* \* \* \*